(12) United States Patent
Chalubert et al.

(10) Patent No.: US 9,459,725 B2
(45) Date of Patent: Oct. 4, 2016

(54) SYSTEM AND METHOD FOR DETECTING AND LOCALIZING AT LEAST ONE TOUCH ON A TOUCH-SENSITIVE SURFACE OF AN OBJECT

(71) Applicants: COMMISSARIAT A L'ENERGIE ATOMIQUE ET AUX ENERGIES ALTERNATIVES, Paris (FR); RENAULT s.a.s., Boulogne Billancourt (FR)

(72) Inventors: Gerard Chalubert, Voisins le Bretonneux (FR); Jean-Pierre Nikolovski, Carry-le-Rouet (FR); Nicolas Guenard, Gif-sur-Yvette (FR); Olivier Brelaud, Saulx-Marchais (FR)

(73) Assignees: Commissariat a l'energie atomique et aux energies alternatives, Paris (FR); RENAULT s.a.s., Boulogne Billancourt (FR)

( * ) Notice: Subject to any disclaimer, the term of this patent is extended or adjusted under 35 U.S.C. 154(b) by 21 days.

(21) Appl. No.: 14/428,547

(22) PCT Filed: Sep. 12, 2013

(86) PCT No.: PCT/FR2013/052095
§ 371 (c)(1),
(2) Date: Mar. 16, 2015

(87) PCT Pub. No.: WO2014/041306
PCT Pub. Date: Mar. 20, 2014

(65) Prior Publication Data
US 2015/0234526 A1 Aug. 20, 2015

(30) Foreign Application Priority Data
Sep. 14, 2012 (FR) ...................................... 12 58664

(51) Int. Cl.
*G06F 3/041* (2006.01)
*G06F 3/043* (2006.01)

(52) U.S. Cl.
CPC ............. *G06F 3/0416* (2013.01); *G06F 3/043* (2013.01); *G06F 2203/04104* (2013.01)

(58) Field of Classification Search
CPC combination set(s) only.
See application file for complete search history.

(56) References Cited

U.S. PATENT DOCUMENTS 6,100,877 A 8/2000 Chery et al.
6,741,237 B1 5/2004 Benard et al.
(Continued)

FOREIGN PATENT DOCUMENTS

FR 2 916 545 11/2008
FR 2 948 471 1/2011

OTHER PUBLICATIONS

International Search Report issued Dec. 20, 2013, in PCT/FR13/052095 filed Sep. 12, 2013.

*Primary Examiner* — Van Chow
(74) *Attorney, Agent, or Firm* — Oblon, McClelland, Maier & Neustadt, L.L.P.

(57) ABSTRACT

A system for detecting and localizing at least one touch on a touch-sensitive surface of an object includes: at least two separate sources transmitting bulk acoustic waves in the touch-sensitive surface, configured to generate acoustic interference between the transmitted waves; at least one bulk acoustic wave receiver after propagation and interference thereof in the touch-sensitive surface, configured to supply a reception signal based on the acoustic waves received; a mechanism localizing at least one touch on the touch-sensitive surface of the object by comparing certain spectral characteristics of the reception signal to a set of reference spectral characteristics; a mechanism measuring a temperature of the touch-sensitive surface, and a mechanism adapting the spectral characteristics of the reception signal or the reference spectral characteristics by a frequency shift of at least some of the spectral characteristics as a function of the temperature measured.

10 Claims, 3 Drawing Sheets

(56) References Cited

U.S. PATENT DOCUMENTS

| | | | |
|---|---|---|---|
| 8,199,126 B1* | 6/2012 | Taubman | G06F 3/011 345/156 |
| 2005/0072523 A1* | 4/2005 | Businger | B29C 63/0013 156/763 |
| 2008/0284743 A1* | 11/2008 | Hsu | G06F 3/0488 345/173 |
| 2011/0234545 A1* | 9/2011 | Tanaka | G06F 3/0436 345/177 |
| 2012/0120014 A1 | 5/2012 | Nikolovski et al. | |

* cited by examiner

SYSTEM AND METHOD FOR DETECTING AND LOCALIZING AT LEAST ONE TOUCH ON A TOUCH-SENSITIVE SURFACE OF AN OBJECT

The present invention relates to a system and method for detecting and localizing at least one touch on a touch-sensitive surface of an object. It also relates to a method used by this system.

The prior art includes various systems for detecting and localizing touches on a touch-sensitive surface, comprising means for transmitting bulk acoustic waves in the touch-sensitive surface, means for receiving bulk acoustic waves after the propagation thereof in the touch-sensitive surface, designed to supply a reception signal on the basis of the acoustic waves received, and means for detecting and localizing touch on the touch-sensitive surface on the basis of the reception signal.

The patent published under the number U.S. Pat. No. 6,741,237 describes a system using the disruption of a transit time of seismic acoustic waves propagated in an object, for example a touch-sensitive screen, between a transmitting transducer and at least two receiving transducers arranged about the object such that this disruption induces different fluctuations in the transit times from the disruption zone to the two receiving transducers. This system is only based on differences in transit times and requires the arrangement of the transducers in precise locations about the object in order to maximize the transit time differentials along at least two separate directions, for example in the corners for a rectangular touch-sensitive screen panel. Furthermore, it makes it possible to detect an isolated touch type disruption, but not to characterize it further.

To enhance the sensitivity of the system, proposing solutions based on spectral reception signal analysis is known. The present invention thus more specifically applies to a system and method for detecting and localizing at least one touch on a touch-sensitive surface of an object, comprising:
  at least two separate sources for transmitting bulk acoustic waves in the touch-sensitive surface, arranged so as to generate acoustic interference between the transmitted waves,
  at least one bulk acoustic wave receiver after the propagation and interference thereof in the touch-sensitive surface, designed to supply a reception signal on the basis of the acoustic waves received, and
  means for localizing at least one touch on the touch-sensitive surface of the object by comparing certain spectral characteristics of the reception signal to a set of reference spectral characteristics.

By way of example, the patent published under the number FR 2 916 545 describes a system using absorption signature recognition relating to a seismic acoustic wave on a set of resonance figures of the touch-sensitive interface. The relative damping and phase-shift for each frequency induced by a touch represent one of the frequency components of a relative damping vector constructed on a pre-defined number of resonance figures. Using this system, it is possible to accurately detect and localize an interaction on any surface using a reduced number of transducers, according to a rate of measurements of up to fifty localizations per second. Nevertheless, this system involves the drawback of being sensitive to temperature variations, affecting the absorption signature. However, for some applications that can be envisaged, such as those of the automotive field, the touch-sensitive interface is intended to be arranged in an environment liable to be subject to significant temperature variations, for example a vehicle passenger compartment.

An enhancement of this system is proposed in the French patent application published under the number FR 2 948 471 wherein resonance figures are no longer used but transient radiation figures, generally referred to as "pulse diffraction figures". As such, the localization method used is not dependent on the natural frequencies of the object and is further capable of detecting multiple touches. However, here again, the detection system remains sensitive to temperature variations, affecting the pulse diffraction figures.

It may thus be sought to provide a system for detecting and localizing touch which makes it possible to do away with at least some of the problems and constraints mentioned above, in particular which is less sensitive to temperature variations.

It is thus proposed a system for detecting and localizing at least one touch on a touch-sensitive surface of an object, comprising:
  at least two separate sources for transmitting bulk acoustic waves in the touch-sensitive surface, arranged so as to generate acoustic interference between the transmitted waves,
  at least one bulk acoustic wave receiver after the propagation and interference thereof in the touch-sensitive surface, designed to supply a reception signal on the basis of the acoustic waves received,
  means for localizing at least one touch on the touch-sensitive surface of the object by comparing certain spectral characteristics of the reception signal to a set of reference spectral characteristics,
further comprising:
  means for measuring a temperature of the touch-sensitive surface, and
  means for adapting the spectral characteristics of the reception signal or the reference spectral characteristics by means of a frequency shift of at least some of these spectral characteristics as a function of the temperature measured.

As such, by adapting either the reference spectral characteristics, or the spectral characteristics of the reception signal, to the temperature measured in respect of the touch-sensitive interface, it becomes possible to retain the reliability of a localization by comparing these spectral characteristics over a wide range of temperatures even though the reference spectral characteristics were established or learned at a specific temperature. The adaptation may further be carried out very simply by means of a frequency shift: indeed, it was observed that the influence of the temperature on the spectral characteristics to be compared is essentially based on the shift thereof for a given propagation mode. This results in a superior temperature behavior of the detection and localization system.

Optionally, the adaptation means are designed to shift each spectral characteristic of the reception signal according to the temperature measured, on the basis of a predefined correspondence saved in memory, for a set of pre-determined temperatures, between a plurality of successive frequencies or frequency bands and a plurality of frequency shift values associated respectively with these successive frequencies or frequency bands.

Also optionally, the means for measuring temperature comprise:
  a calculator for calculating a norm of the spectrum of the reception signal in a pre-determined frequency band, a comparator of this calculated norm to a set of reference norms associated respectively with a set of temperatures, a temperature selector on the basis of the result supplied by the comparator.

Also optionally, the transmission sources and the receiver are arranged asymmetrically on the periphery of the touch-sensitive surface and the excitation of the transmission sources is established such that the relationship between the set of reference norms and the set of temperatures is an increasing or decreasing monotonic relationship.

Also optionally, the means for measuring temperature comprise a temperature sensor, particularly a thermistor, arranged in contact with the touch-sensitive surface.

Also optionally, the bulk acoustic waves being propagated in the touch-sensitive surface in the form of Lamb waves, two receivers are arranged facing each other against the touch-sensitive surface, these receivers being polarized and interconnected so as to only receive essentially the fundamental anti-symmetric Lamb mode and reject symmetric waves and transverse horizontal waves.

Also optionally, the two receivers are arranged so as to have symmetrically oriented polarizations relative to the median plane of the touch-sensitive surface and are electrically connected together in series.

It is also proposed a method for detecting and localizing at least one touch on a touch-sensitive surface of an object, comprising:

transmission in the touch-sensitive surface, by at least two separate sources, of mutually interfering bulk acoustic waves, reception, by at least one receiver, of bulk acoustic waves after the propagation and interference thereof in the touch-sensitive surface, and supply of a reception signal on the basis of the acoustic waves received, localization of at least one touch on the touch-sensitive surface of the object by comparing certain spectral characteristics of the reception signal to a set of reference spectral characteristics saved in memory, and further comprising:

measurement of a temperature of the touch-sensitive surface, and adaptation of the spectral characteristics of the reception signal or the reference spectral characteristics by means of a frequency shift of at least some of these spectral characteristics as a function of the temperature measured.

Optionally:

each spectral characteristic of the reception signal is shifted according to the temperature measured, on the basis of a predefined correspondence, for a set of pre-determined temperatures, between a plurality of successive frequencies or frequency bands and a plurality of frequency shift values associated respectively with these successive frequencies or frequency bands, and these frequency shift values are learned during a prior learning phase by matching spectral characteristics retrieved off-load at different temperatures with spectral characteristics retrieved off-load at the temperature for learning the reference spectral characteristics.

Also optionally, the bulk acoustic waves are transmitted in the form of successive pulse wavetrain transmissions at different frequencies between a minimum frequency and a maximum frequency common to the wavetrains, and:

the minimum frequency is greater than one-third of the maximum frequency, each wavetrain from the second differs from the previous one by a frequency shift of the pulse waves thereof by a fraction of the mean frequency deviation between the pulse waves.

The invention will be understood more clearly using the following description, given merely by way of example and with reference to the appended figures wherein.

Figure 1:
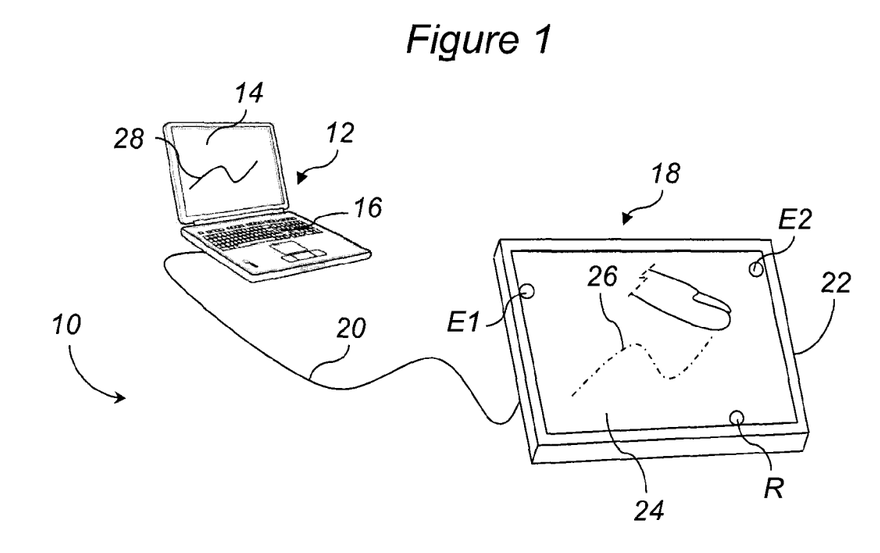
FIG. 1 schematically represents a perspective view of a system for detecting and localizing at least one touch on a touch-sensitive surface of an object, according to a first embodiment of the invention, FIG. 2 schematically represents a front view of a system for detecting and localizing at least one touch on a touch-sensitive surface of an object, according to a second embodiment of the invention.

The system 10 for detecting and localizing at least one touch on a touch-sensitive surface of an object, represented in FIG. 1, comprises a microcomputer 12 particularly comprising a monitor 14 and a keyboard 16, and an object 18 of the interactive tablet type, connected to the microcomputer 12 via a wired or radio link 20.

The interactive tablet 18 comprises a frame 22 and a touch-sensitive surface 24 held by the frame on at least a part of the edges thereof. The touch-sensitive surface 24 is presented for example in the form of a metal, glass or plastic panel, vibrating when elastic mechanical waves, or bulk acoustic waves, are propagated in the thickness thereof. It may be rectangular in shape, particularly in 4/3 format. In concrete terms, it may have a length of 100 mm, a width of 75 mm and a relatively small thickness with respect to the length and width thereof, particularly between 100 µm and 4 mm, for example 450 µm. This thickness is also very small in relation to the characteristic size of a zone of the touch-sensitive surface 24 liable to be touched, a user's finger generally representing a touch approximately one centimeter in diameter.

In the example illustrated in FIG. 1, three piezoelectric transducers E1, E2 and R are mounted against the internal face of the touch-sensitive panel 24, i.e. that which is not accessible to touch and facing the inside of the frame 22. They may particularly be glued to the panel 24, using a conductive epoxy or cyanoacrylate adhesive.

These piezoelectric transducers are for example LZT type ferroelectric ceramic transducers (Lead Zirconate Titanate), wherein the ceramic material is bare or laminated on a brass disk. They comprise:

two separate transmitting transducers E1 and E2 suitable for transmitting elastic mechanical waves (i.e. bulk acoustic waves in the broad sense) in bending modes, such as for example anti-symmetric Lamb waves, such that they are propagated and interfere acoustically in the touch-sensitive panel 24, a receiving transducer R suitable for picking up elastic mechanical waves, or bulk acoustic waves, after the propagation thereof in bending modes and the interference thereof in the touch-sensitive panel 24.

These three transducers are preferably arranged outside any axis of symmetry of the touch-sensitive panel 24. Furthermore, they may be small in size and have any geometric shape. In particular, for a touch-sensitive panel 24 with the above-mentioned dimensions (75 mm×100 mm×0.45 mm), they may have a surface area between a few square millimeters and one square centimeter. If the transmitting transducers E1 and E2 are excited by 10 V signals, the reception signal supplied by the receiving transducer R may be up to 0.2 V without amplification.

The transducers E1, E2 and R are connected to an electronic central control unit, for example integrated in the microcomputer 12 and programmed for:

propagating and interfering in the touch-sensitive panel 24 bulk acoustic waves on the basis of the piezoelectric transducers E1 and E2 and having these acoustic waves detected by the piezoelectric transducer R in order to obtain a reception signal, and localizing at least one touch on the touch-sensitive panel 24 by comparing some spectral features of the reception signal to a set of reference spectral features, these reference spectral features having been learned during a previous calibration phase at a given temperature of the touch-sensitive panel 24.

The bulk acoustic waves transmitted in the touch-sensitive panel 24 from the piezoelectric transducers E1 and E2 are indeed locally absorbed, blocked or partially reflected when at least one finger or a stylus is in contact with the panel. This gives rise to a disruption of the illumination or radiation information supplied at the reception point R. By retrieving some spectral features, for example spectral amplitude and/or phase parameters, at pre-determined frequencies of the disrupted illumination or radiation information, it is possible to compare same to reference spectral characteristics retrieved from a library of parameters associated with pre-determined touches and deduce a possible localization of a single or multiple touch therefrom. The methods used in the above-mentioned documents FR 2 916 545 and FR 2 948 471 are applicable. In particular, the waves transmitted by the transducers E1 and E2 may be embodied by acoustic wavetrains consisting of a plurality of predefined frequencies, for example between 35 kHz and 96 kHz, for the formation of an illumination or radiation figure in a broad spectrum.

This provides, for each touch on the touch-sensitive panel 24, using one or a plurality of fingers or a stylus, a localization or this single or multiple touch which may for example be viewed on the monitor of the microcomputer 12. By extension, for a sequence of single or multiple touches detected on the touch-sensitive panel 24, forming a single or multiple trace 26, a localization of this trace 26 may be viewed on the monitor of the microcomputer 12, in the form of a kinematic curve 28 obtained by interpolating the trace 26 detected.

Figure 2:
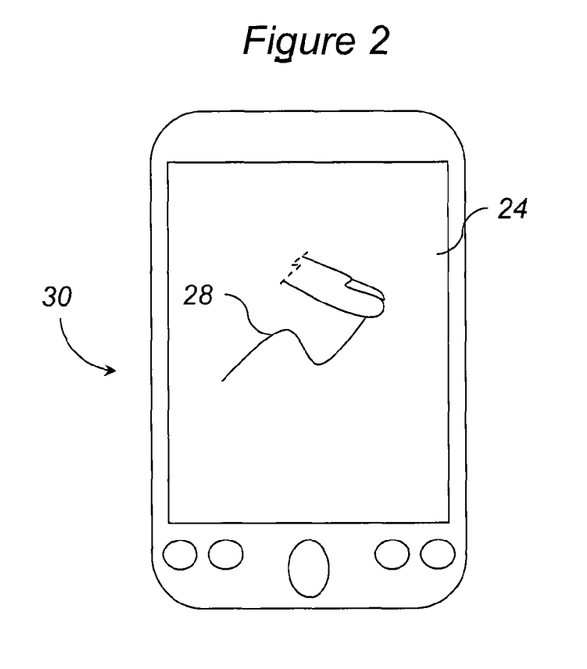

According to a further embodiment of the invention illustrated in FIG. 2, the touch-sensitive panel 24 may be transparent and integrated with the electronic central control unit in an embedded electronic system 30, such as a mobile telephone, a personal digital assistant or any other portable or onboard device such as an onboard touch-sensitive man-machine interface in a motor vehicle. In this case, it may also optionally act as a screen for viewing the kinematic curve 28 obtained by interpolating the trace 26 detected.

However, it has been observed that the spectral characteristics of the reception signal are very sensitive to the temperature of the touch-sensitive panel 24 which may rapidly render the reference spectral characteristics learned previously inoperative on deviating from the reference temperature of touch-sensitive panel in the calibration step. In practice, a deviation of merely 1° C. with the reference temperature is sufficient to significantly degrade the recognition of the localization of the touch detected.

As a general rule, a first effect of temperature variations relates to the mean amplitude of the spectrum of the reception signal. This varies with the temperature. In particular, by choosing good relative arrangements between the piezoelectric transducers E1, E2 and R, the variation of the norm of the reception signal spectrum in a pre-determined frequency band (for example the frequency band [35 kHz, 96 kHz]) may be in an increasing or decreasing monotonic relationship with the temperature variation. A bijective relationship may then be established between the norm of the reception signal spectrum and the temperature of the touch-sensitive panel 24. A learning process may thus make it possible to use this bijective relationship to measure the temperature of the touch-sensitive panel 24 by calculating the norm of the reception signal spectrum.

Also as a general rule, a second effect of the temperature variations relates to the frequencies of the spectral characteristics. A shift in these frequencies may be observed when the temperature varies. When the spectral characteristics processed are the spectral amplitudes of the reception signal, this gives rise to a shift, which is not necessarily uniform, in the spectrum. A learning process may then make it possible to establish a correspondence, for a set of pre-determined temperatures, between a plurality of successive frequencies or frequency bands and a plurality of frequency shift values associated respectively with these successive frequencies or frequency bands. This learning process thus makes it possible to correct, by means of a frequency shift, the spectral characteristics of the reception signal or the reference spectral characteristics before carrying out the comparisons. Preferably, the spectral characteristics of the reception signal are corrected before being compared to the reference spectral characteristics, the latter being saved in memory.

Figure 3:
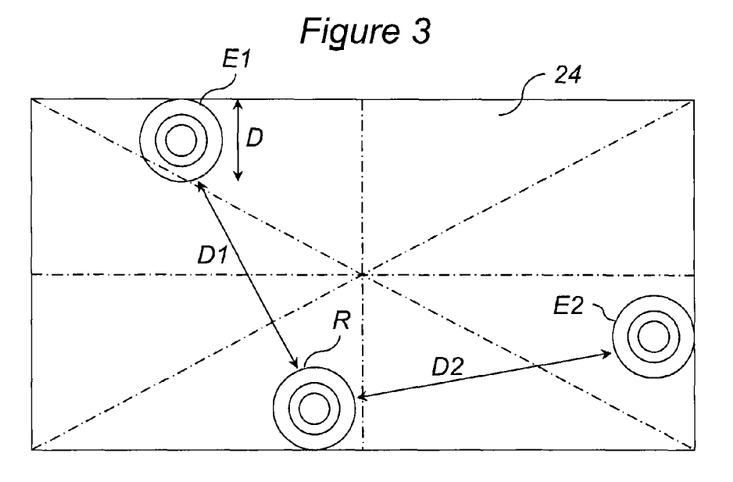
FIG. 3 illustrates a top view of an example of an arrangement of transducers against a touch-sensitive surface of a detection and localization system according to the invention.

As shown in FIG. 3, the piezoelectric transducers E1, E2 and R are arranged against the touch-sensitive panel 24, on the edges thereof but preferably outside the axes of symmetry thereof (represented with mixed broken lines). The relative arrangement of these transducers and the excitation of the transmitters are furthermore suitably chosen to ensure the increasing or decreasing monotonicity of the relationship between the norm of the spectrum of the reception signal picked up by the transducer R and the temperature of the touch-sensitive panel 24. This is for example obtained merely by exciting the transducers E1 and E2 in antiphase and by arranging same with a distance differential |D2−D1| less than or equal to D/2 with respect to the receiver R, where D is a characteristic half-wavelength in the material of the touch-sensitive panel 24 further corresponding to the diameter of the transducers E1, E2 and R, where D1 is the distance between E1 and R and D2 the distance between E2 and R. In this configuration, the interferences viewed by the receiver R are indeed mostly destructive.

The monotonic relationship may also be obtained without restriction on |D2−D1| by independently exciting the transducers E1 and E2 but by adjusting a delay in these excitations. The delay or phase shift between the transducers E1 and E2 optimizing the monotonic variation of the norm of the respective signal spectrum according to the temperature of the touch-sensitive panel 24 equals $3\lambda/4$, where $\lambda$ is the wavelength associated with the working frequency of these transducers. When the temperature falls, the transit time differential between the two transmitting transducers E1 and E2 decreases and the phase shift then tends toward $\lambda/2$. The consequence is that the signal decreases, whereas when the temperature increases, the phase shift tends toward $\lambda$ and the signal increases. It is further known that, over a temperature range between 0° C. and 70° C., the speed variation may be up to 20% and thus the transit time differential between the transmitters may vary by 25%: in other words, for a speed varying between 0.8. V and V, the transit time differential varies between (D1–D2)/V and (D1–D2)/(0.8. V). To ensure that the time differential is always less than one quarter-period regardless of the working frequency, it may be stipulated that the path differential between E1 and E2 to the receiver R is always less than one-quarter of the lowest wavelength. This constraint is strong as the variation of the norm of the reception signal spectrum is dependent on all the wavelengths generated, short and long. Depending on the material used, this gives a lower limit value of the maximum path differential between E1 and E2 of 1 mm for plastics and 5 mm for glass. An upper limit value of the maximum path differential between E1 and E2 is for example estimated for a speed variation of 10% and a median wavelength corresponding to a frequency of 70 kHz. This gives an upper limit value of 2 to 3 mm for plastics and of 12 to 13 mm for glass and metals.

Figure 4:
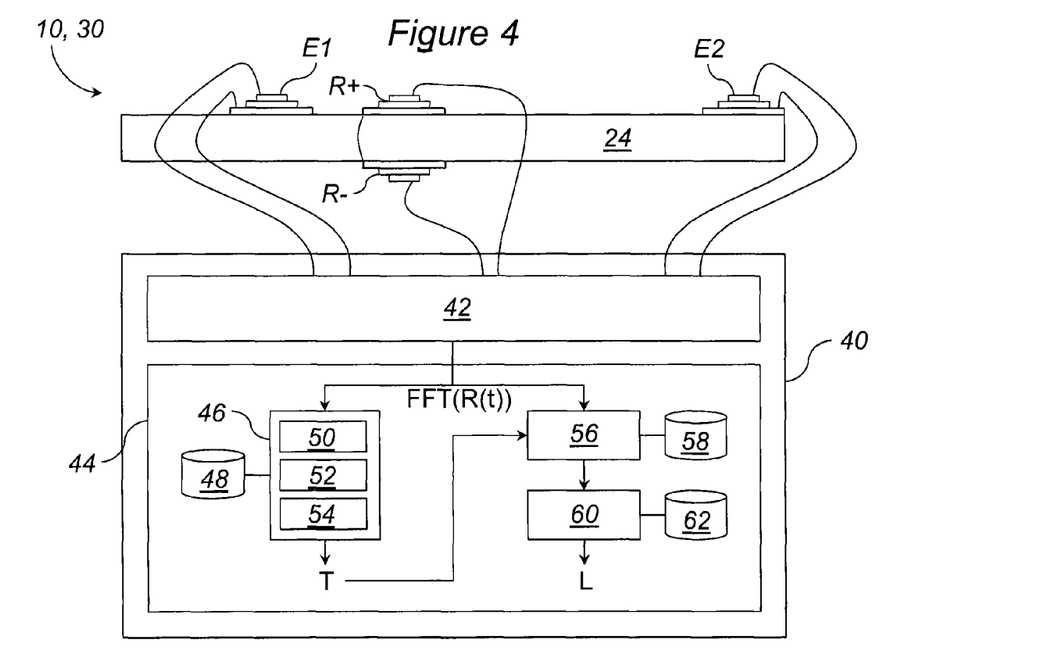
FIG. 4 illustrates a side view of the touch-sensitive surface in FIG. 3, connected to an electronic control central unit of the system in FIG. 1 or 2.

The touch-sensitive panel 24 is represented in a side view in FIG. 4. It is connected to an electronic central control unit 40 comprising:

a bulk acoustic volume transmission/reception microcontroller 42, more specifically electrically connected to the piezoelectric transducers E1, E2 and R, and a processing module 44 programmed for digitally processing the reception signals supplied by the transmission/reception microcontroller 42 to detect and localize single or multiple touches on the touch-sensitive panel 24.

The transmission/reception microcontroller 42 is provided with an arithmetic and logical unit, optionally controlled by the microcontroller 12 in the case of the device 10. It comprises an output connected to a digital/analog converter wherein the output is connected, if required via amplifiers, to the transmitting transducers E1 and E2. Furthermore, the receiving transducer R is connected to an analog/digital converter in turn connected to or an integral part of the transmitting/receiving microcontroller 42. This analog/digital converter and the transmitting/receiving microcontroller 42 are suitable for sampling the signals detected over at least 8 bits, preferentially over 10 bits, or even over 12 or more at a rate of at least 192 kHz.

According to one alternative embodiment, or more particularly in the case of a test bench, the analog/digital and digital/analog converters may be replaced by an acquisition board and an arbitrary function generator.

The electrical connections to the transducers E1, E2 and R may consist particularly of audio type coaxial cables or any other shielded connection. This condition is stronger for the receiving transducer R wherein small disruptions are considered than for the two transmitting transducers E1 and E2.

In the example illustrated in FIG. 4, it should further be noted that the receiving transducer R actually consists of two transducers R+ and R− arranged facing each other on either side of the touch-sensitive panel 24. This arrangement in receiving mode is not essential but is advantageously used to enable selective reception of the bulk acoustic waves after the propagation thereof and interference in the touch-sensitive panel 24. In particular, it is aimed at retrieving a reception signal R(t) only essentially dependent on the fundamental anti-symmetric Lamb wave propagation mode A0. As a general rule, as the frequencies used in transmission do not exceed 100 kHz, bulk acoustic waves are propagated in a thin panel in the form of Lamb waves in three modes: symmetric mode (S), anti-symmetric mode (A) and transverse horizontal mode (TH), each of these modes comprising a fundamental component and harmonics. However, in each of these modes, the waves are propagated at different speeds and these speeds vary differently according to the temperature and the material. As such, any temperature variation generates, besides a variation in the norm of the spectrum and a frequency shift, spectral distortion of the reception signal if this signal comprises a plurality of propagation modes. Furthermore, given that it is the essentially the fundamental anti-symmetric mode A0 that reacts to a single or multiple touch on the touch-sensitive panel 24, it is advantageous to filter (i.e. reject or discriminate) the other modes to prevent these distortions.

The selective reception of the fundamental anti-symmetric Lamb wave propagation mode A0 using two transducers R+ et R− arranged opposite each other may be envisaged in concrete terms in different ways:

the two transducers R+ and R− are arranged so as to have asymmetrically oriented polarizations relative to the median plane of the touch-sensitive panel 24 and are electrically connected together in parallel, the two transducers R+ and R− are arranged so as to have symmetrically oriented polarizations relative to the median plane of the touch-sensitive panel 24 and are electrically connected together in antiparallel, the two transducers R+ and R− are arranged so as to have symmetrically oriented polarizations relative to the median plane of the touch-sensitive panel 24 and are electrically connected together in series (arrangement illustrated in FIG. 4, requiring less connection cables than the first two and easy to embody when the LZT transducers can be connected via the brass disks thereof).

These three types of arrangement are only effective if the touch-sensitive panel has a relatively homogeneous and isotropic thickness.

Alternatively or additionally to the selective reception of the fundamental anti-symmetric Lamb wave propagation mode A0 using the two transducers R+ et R− arranged facing each other, it is also possible to envisage selective transmission of this fundamental anti-symmetric mode using pairs of transmitting transducers (E1+ and E1−, E2+ and E2−) arranged facing each other. However, in practice, this alternative or this addition is not very advantageous since it gives rise to a significant increase in the static capacitance of the transmitting transducers and thus in the electrical power consumption.

The reception signal R(t) digitized by the transmission/reception microcontroller 42 may be transformed by means of FFT (Fast Fourier Transform) before being sent to the processing module 44. In this case, the spectrum of the reception signal R(t), annotated FFT(R(t)), is received and processed by the module 44.

The processing module 44 may optionally comprise a module 46 for measuring the temperature of the touch-sensitive panel 24 on the basis of the variations of the Euclidean norm of the spectrum of the off-load reception signal FFT(R(t)). The term off-load reception signal denotes the reception signal transmitted by the transmission/reception microcontroller 42 when no single or multiple touch is detected. A prior learning process, as mentioned above, makes it possible to establish a bijective relationship between different temperature values of the touch-sensitive panel 24 and different values of the Euclidean norm of the off-load reception signal FFT(R(t)). This relationship is saved in a memory area 48 to which the measurement model 46 has read access.

In this case, the measurement module 46 comprises:
a calculator 50 of a mean norm value, for example Euclidean, of the spectrum of the reception signal in a pre-determined frequency band and in a pre-determined window of time,
a comparator 52 of this calculated norm, annotated ‖FFT (R(t))‖, to a set of reference norms associated respectively with a set of temperatures in the memory area 48,
a temperature T selector 54 on the basis of the result supplied by the comparator 52.

Alternatively and according to the same bijective relationship principle between temperature variations and spectral variations, the measurement module 46 could process the effect of the temperature variations on the frequency shift of the off-load reception signal. As such, according to a first alternative embodiment, a method used by the measurement module 46 could be that of computing the frequential barycenter of the off-load spectrum FFT(R(t)) in a pre-determined frequency band, the spectral position of this barycenter being bijectively associated with a temperature according to a similar learning process to that mentioned above. According to a further alternative embodiment, the measurement module 46 could compute a local extremum of the off-load spectrum FFT(R(t)), this extremum corresponding to a particular resonance frequency of the propagation medium formed by the touch-sensitive panel 24. In this case, specific frequency scanning may even be performed around this resonance frequency, for example between 39 kHz and 41 kHz if the resonance is situated at 40 kHz. A high-resolution FFT computation in this specific range enables in this case precise detection of the position of the local extremum, optionally involving a quadratic interpolation of the FFT about the extremum. As for the frequential barycenter and for the Euclidean norm, a frequency shift of the local extremum conveys a temperature variation. The frequency shift of the local extremum may further be observed without involving an FFT computation but merely by measuring the peak amplitude of the reception signal R(t) at some ten pre-defined frequencies around the approximate position of the extremum followed by quadratic interpolation. This computation is simpler and quicker than an FFT computation. It may also be applied for computing the frequential barycenter merely on some ten predefined frequencies.

Also alternatively, it is possible to do away with the measurement module 46 by replacing same by a temperature sensor arranged in contact with the touch-sensitive panel 24, for example a thermistor, and suitable for supplying the measured values thereof to the processing module 44.

The processing module 44 comprises a module 56 for adapting the spectrum FFT(R(t)) of the reception signal by shifting the components thereof according to the measured temperature T. It supplies a corrected spectrum FFT'(R(t)) of the reception signal. A prior learning process, as mentioned above, makes it possible to establish, for example for each temperature value suitable for being measured by the module 46, a correspondence between the successive frequencies of the off-load spectrum FFT(R(t)) and the frequency shift values to be applied for recalibration on a reference temperature. As a more general rule, the correspondence may be established, for a set of pre-determined temperatures, between a plurality of successive frequencies or frequency bands and a plurality of frequency shift values associated respectively with these successive frequencies or frequency bands. This pre-established correspondence is saved in a memory area 58 to which the adaptation module 56 has read access. It is learned on off-load reception signals as it was observed that the frequency shift according to the temperature has little dependence on the fact that a single or multiple touch is detected or not.

Finally, the processing module 44 comprises a module 60 for localizing L at least one touch on the touch-sensitive panel 24 by comparing certain spectral characteristics of the reception signal, in this instance the corrected spectrum FFT'(R(t)) thereof over a pre-determined frequency band, to a set of reference spectral characteristics, stored in a memory area 60 to which the localization module 60 has read access. These reference spectral characteristics relate to different localizations of single or multiple touches learned prior to the reference temperature mentioned above. Alternatively, the reference spectral characteristics may be corrected before being compared to the spectral characteristics of the reception signal, but it is clear that it is simpler in practice to correct those of the reception signal.

Figure 5:
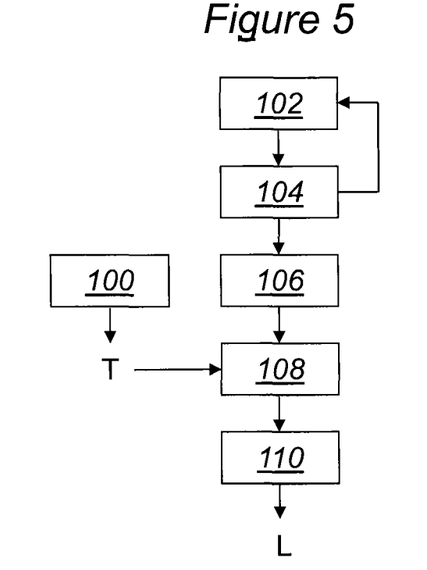
FIG. 5 illustrates the successive steps of a method for detecting and localizing at least one touch on a touch-sensitive surface of an object, according to an embodiment of the invention.

A method for detecting and localizing single or multiple touches used by the system 10 or 30 described above will now be described in detail with reference to FIG. 5.

During a measurement step 100, repeated regularly and in parallel with the other steps of this method, the temperature T of the touch-sensitive panel 24 is measured by the measurement module 46 of the detection and localization system 10 or 30.

During a step 102, bulk acoustic waves are transmitted in the touch-sensitive panel 24 by the transmitting transducers E1 and E2 on the command of the transmission/reception microcontroller 42.

During a step 104, the acoustic waves transmitted are received by the receiving transducer R after being propagated in the touch-sensitive panel 24 and having interfered with each other. The transmission/reception microcontroller 42 processes the analog signal returned by the transducer R to supply a digitized reception signal, transformed by FFT. The resulting spectrum FFT(R(t)) is sent to the processing module 44.

The steps 102 and 104 are repeated in loops.

During a step 106 performed following one of the instances of the repeated step 104, a single or multiple touch is detected. This detection may result from a sudden variation of certain characteristics of the reception signal or the spectrum thereof (attenuation, distortion of the spectrum relative to an off-load reference spectrum, etc.).

During an adaptation step 108, according to the measured temperature T and the frequency shift parameters stored in the memory area 58, the spectrum FFT(R(t)) is adapted by the module 56 for recalibration to the form that should have been adopted at the reference temperature. Following this step, the corrected spectrum FFT'(R(t)) is sent to the localization module 60.

Finally, during a localization step 110, the module 60 compares the corrected spectrum FFT'(R(t)) to reference spectra which were previously learned for a plurality of given single or multiple touches at the reference temperature. It infers according to a method known from the documents FR 2 916 545 and FR 2 948 471 cited above the localization(s) L of the touch detected.

Figure 6:
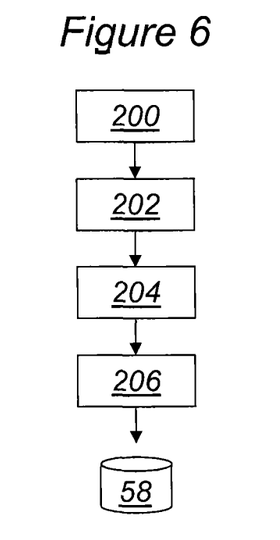
FIG. 6 illustrates the successive steps of a learning phase prior to the execution of the method in FIG. 5.

The learning phase for feeding the memory area 58 with frequency shift parameters to be applied to each measured temperature will now be described in detail with reference to FIG. 6.

According to a first step 200 of this learning phase, off-load spectra are obtained at different temperatures (the number sought and required to ensure a satisfactory temperature behavior of the detection and localization system throughout the learned temperature range) and compared to the off-load spectrum obtained at the reference temperature, or reference spectrum. To perform this comparison, points of interest of the off-load spectra are identified. It consists for example of the peaks and troughs readily found in each off-load spectrum.

During a subsequent step 202, for each temperature concerned by this learning phase, the points of interest of the corresponding off-load spectrum are matched respectively with the same points of interest of the reference spectrum. The frequency shift to be carried out to switch from each point of interest of the corresponding off-load spectrum at the temperature in question to the counterpart thereof in the reference spectrum is then inferred.

Subsequently, during a step 204, by means of linear interpolation between each of the points of interest, the shift parameter values for each frequency of the spectral band of interest are inferred.

Finally, during a final step 206, it remains optionally to invert the shift direction and save the resulting shift parameters in the memory area 58. These parameters are then used to correct any spectrum FFT(R(t)) obtained at a temperature T so that it corresponds to that which should have been obtained at the reference temperature, i.e. the temperature at which the single or multiple touch learning processes, used by the localization module 60 in the step 110, were performed.

This adaptation of the spectrum FFT(R(t)) according to the measured temperature makes it possible to very significantly enhance the temperature behavior of the detection and localization system. Experimentally, it was demonstrated that a temperature behavior of more than 20° C. may thus be obtained on the basis of single set of reference spectral characteristics learned at a single reference temperature. As such, for a learning process conducted at 20° C., the temperature behavior proves to be satisfactory between 10° C. and 30° C.

Furthermore, to reinforce this enhancement of the system performances, further enhancements may generally be made.

As such, for the adaptation of the spectrum FFT(R(t)) to function, the spectral resolution of the measurement electronics, typically 100 Hz, must be sufficient in relation to the fluctuations of the spectrum of the touch-sensitive panel used. In other words, the panel must be slightly reverberant so that it does not have overly selective resonance peaks. In practice, the acoustic waves are relatively effectively damped in plastic panels or bodies, but much more weakly damped in glass or metal panels, particularly if the object with a touch-sensitive surface has a high symmetry such as for example in the case of the examples illustrated in FIGS. 1 to 4. In such cases, it is advantageous to add a damping foam on the surface of the touch-sensitive panel (for example, a medium to high-density PVC alveolar, polyurethane foam). It is also possible to coat or dip one face of the touch-sensitive panel in a silicone bath to form a silicone layer of up to 0.5 mm to 2 mm in thickness. The damping layer may be limited to the periphery of the touch-sensitive panel or body.

As such also, in view of the shift observed in the frequencies according to the temperature variations of the touch-sensitive panel 24, for the recalibration of the touch disruptions according to the proposed adaptation to function with satisfactory performances, it is advantageous for the excitation spectrum of the transmitting transducers E1 and E2 to be as flat as possible in the spectral band of interest. A wavetrain having a square spectrum is thus transmitted in a frequency band wherein the lower and upper limits exclude the third harmonic. A lower limit greater than one-third of the upper limit is then chosen. Furthermore, it is observed that the higher the spectrum or the thinner the panel, the better the resolution of the method proposed. For a given panel thickness, it is then possible to define a threshold above which the frequencies are no longer taken into account in computing the detection and localization of touches as the localization would be overly spatially discriminatory.

At low frequencies, the threshold of hearing sets the limit, with these frequencies being capable of entering the audible range if the excitation amplitude of the transducers E1 and E2 is significantly reduced and if R(t) is subject to greater amplification. For this reason, the previously mentioned frequency band of [35 kHz, 96 kHz] is relevant for many materials wherein the thickness is situated between 1 mm and 6 mm. Furthermore, in order to limit the undulations on the spectrum, the optimum number of frequencies to be generated to produce the flattest possible template is chosen. In the example of the frequency band of [35 kHz, 96 kHz], the optimum is situated around a transmission of sixty frequencies. It should be noted that, in concrete terms, the term "frequency transmission" denotes the transmission of a cardinal sine type pulse centered around the frequency in question.

Furthermore, for maximum flattening of the transmission spectrum, it is possible to use an original frequency scanning excitation technique to remove the noise included in the spectrum further. This is intended to excite the touch-sensitive panel 24 with frequencies varying cyclically over time and average the result obtained. As such, for a spectrum generated by the transmission of wavetrains at N frequencies ranging from Fmin (for example 35 kHz) to Fmax (for example 96 kHz), the deviation between two frequencies and thus two consecutive lobes of the spectrum being approximately $\Delta f=(Fmax-Fmin)/N$, generating P times the same wavetrain but shifted, each time, by a fraction $\Delta f/P$ of this deviation, and then dividing by P, the equivalent of lobe-free excitation is obtained. The price to pay is the number P of wavetrains to be transmitted successively so as only to end up with a single spectrum. It is thus necessary to reach a compromise between the spectrum precision required and the computing time. It may be chosen for example to only carry out P=2 wavetrain transmissions to flatten the spectrum while retaining an acceptable computing time.

Finally, after having been identified using a conventional method, it is also possible to take into consideration the transfer functions of the transducers E1, E2 and R so as to compensate for same in wavetrain transmission and in signal reception. For this purpose, the amplitude of the signal sent or the duration of transmission of each of the frequencies may be adjusted.

It is obvious that the system for detecting and localizing single or multiple touches as described above makes it possible to ensure a satisfactory temperature behavior in spite of a learning process of the touches liable to be localized performed at a single reference temperature.

It should further be noted that the invention is not limited to the embodiments described above.

In particular, the touch-sensitive panel 24 illustrated and described in detail with reference to the examples in FIGS. 1 and 2 may be replaced by any touch-sensitive body of any shape, including three-dimensional.

It will more generally be clear to those skilled in the art that various modifications may be made to the embodiments described above, in the light of the teaching described herein. In the claims hereinafter, the terms used should not be interpreted as limiting the claims to the embodiments disclosed in the present description, but should be interpreted to include therein any equivalents intended to be covered by the claims due to the wording thereof and which can be envisaged by those skilled in the art by applying general knowledge to the implementation of the teaching disclosed herein.

The invention claimed is:

1. A system for detecting and localizing at least one touch on a touch-sensitive surface of an object, comprising:
    at least two separate sources for transmitting bulk acoustic waves in the touch-sensitive surface, configured to generate acoustic interference between the transmitted waves;
    at least one bulk acoustic wave receiver after propagation and interference thereof in the touch-sensitive surface, configured to supply a reception signal on the basis of the acoustic waves received;
    means for localizing at least one touch on the touch-sensitive surface of the object by comparing certain spectral characteristics of the reception signal to a set of reference spectral characteristics;
    means for measuring a temperature of the touch-sensitive surface; and
    means for adapting the spectral characteristics of the reception signal or the reference spectral characteristics by a frequency shift of at least some of the spectral characteristics as a function of the temperature measured.

2. A system for detecting and localizing at least one touch according to claim 1, wherein the adaptation means is configured to shift each spectral characteristic of the reception signal according to the temperature measured, on the basis of a predefined correspondence saved in memory, for a set of pre-determined temperatures, between a plurality of successive frequencies or frequency bands and a plurality of frequency shift values associated respectively with these successive frequencies or frequency bands.

3. A system for detecting and localizing at least one touch according to claim 1, wherein the means for measuring temperature comprises:
    a calculator for calculating a norm of the spectrum of the reception signal in a pre-determined frequency band;
    a comparator of this calculated norm to a set of reference norms associated respectively with a set of temperatures;
    a temperature selector on the basis of the result supplied by the comparator.

4. A system for detecting and localizing at least one touch according to claim 3, wherein the transmission sources and the receiver are arranged asymmetrically on a periphery of the touch-sensitive surface and excitation of the transmission sources is established such that a relationship between the set of reference norms and the set of temperatures is an increasing or decreasing monotonic relationship.

5. A system for detecting and localizing at least one touch according to claim 1, wherein the means for measuring temperature comprises a temperature sensor, or a thermistor, arranged in contact with the touch-sensitive surface.

6. A system for detecting and localizing at least one touch according to claim 1, wherein the bulk acoustic waves being propagated in the touch-sensitive surface in a form of Lamb waves, two receivers are arranged facing each other against the touch-sensitive surface, the receivers being polarized and interconnected to only receive essentially the fundamental anti-symmetric Lamb mode and reject symmetric waves and transverse horizontal waves.

7. A system for detecting and localizing at least one touch according to claim 6, wherein the two receivers are arranged to have symmetrically oriented polarizations relative to the median plane of the touch-sensitive surface and are electrically connected together in series.

8. A method for detecting and localizing at least one touch on a touch-sensitive surface of an object, comprising:
    transmission in the touch-sensitive surface, by at least two separate sources, of mutually interfering bulk acoustic waves;
    reception, by at least one receiver, of bulk acoustic waves after the propagation and interference thereof in the touch-sensitive surface, and supply of a reception signal on the basis of the acoustic waves received;
    localization of at least one touch on the touch-sensitive surface of the object by comparing certain spectral characteristics of the reception signal to a set of reference spectral characteristics saved in memory;
    measurement of a temperature of the touch-sensitive surface; and
    adaptation of the spectral characteristics of the reception signal or the reference spectral characteristics by a frequency shift of at least some of these spectral characteristics as a function of the temperature measured.

9. A method for detecting and localizing at least one touch according to claim 8, wherein:
    each spectral characteristic of the reception signal is shifted according to the temperature measured, on the basis of a predefined correspondence, for a set of pre-determined temperatures, between a plurality of successive frequencies or frequency bands and a plurality of frequency shift values associated respectively with these successive frequencies or frequency bands; and
    the frequency shift values are learned during a prior learning phase by matching spectral characteristics retrieved off-load at different temperatures with spectral characteristics retrieved off-load at the temperature for learning the reference spectral characteristics.

10. A method for detecting and localizing at least one touch according to claim 8, wherein the bulk acoustic waves are transmitted in a form of successive pulse wavetrain transmissions at different frequencies between a minimum frequency and a maximum frequency common to the wavetrains, and wherein:
    the minimum frequency is greater than one-third of the maximum frequency,
    each wavetrain from the second differs from the previous one by a frequency shift of the pulse waves thereof by a fraction of the mean frequency deviation between the pulse waves.

* * * * *